United States Patent
Douglas

[15] 3,670,301
[45] June 13, 1972

[54] VEHICLE ANTI-THEFT DEVICE

[72] Inventor: Larry D. Douglas, San Francisco, Calif.

[73] Assignees: Pete Pakulak; Lucile A. Pakulak, San Francisco, Calif.

[22] Filed: March 15, 1971

[21] Appl. No.: 124,018

[52] U.S. Cl. ............................................. 340/65, 340/253
[51] Int. Cl. .................................................... G08b 13/00
[58] Field of Search ................. 340/63, 64, 65, 248, 253; 307/10

[56] References Cited

UNITED STATES PATENTS

| 3,533,064 | 10/1970 | Perelman | 340/63 |
| 3,422,398 | 1/1969 | Rubin | 340/63 |
| 3,569,929 | 3/1971 | Wood | 340/63 |

*Primary Examiner*—Alvin H. Waring
*Attorney*—Arlington C. White

[57] ABSTRACT

A light-weight portable alarm device is readily installed upon a mobile unit and sounds an alarm for a predetermined time interval in the event that an unauthorized person attempts to move the unit. The alarm is operable whether or not the wires of an associated electrical circuit are cut, and it is insensitive to changes in temperature, atmospheric pressures, moisture, dust or vibration.

7 Claims, 2 Drawing Figures

INVENTOR.
LARRY D. DOUGLAS

BY
Arlington L. White
ATTORNEY

VEHICLE ANTI-THEFT DEVICE

Heretofore in the art there have been various types of alarm systems devised for preventing theft of mobile equipment such as automobiles, station wagons, trucks, motorcycles and the like. Among many patents that have been granted on such anti-theft devices are the recent U.S. Pat. No. 3,422,298, on a vehicle solid state alarm system, granted to N. S. Rubin on Jan. 14, 1969; such patent disclosing a solid state trigger circuit having semiconductor components together with three electrical circuits for effecting reduction of the high internal electrical resistance of a semiconductor triode rectifier and to maintain such resistance at a low value to permit electric current to pass and flow through the rectifier to energize an electrically operable alarm device. This Rubin alarm system is elaborate and somewhat expensive to manufacture and maintain. Another elaborate alarm system is disclosed in the R. H. Isaacs et al. U.S. Pat. No. 3,513,466, issued on May 19, 1970 wherein there is disclosed a protective alarm system utilizing both correct and incorrect code switches in a resistor-capacitor circuit containing an output SCR rectifier which when energized passes direct current from a battery to a relay coil for effecting the sounding of an alarm, such as a siren. The system includes a number of push button switches which must be first manually operated to arm or set the alarm on every occasion that an owner leaves the vehicle on which the Isaacs et al. anti-theft device is installed. An earlier patent to J. E. Birth, U.S. Pat. No. 3,310,775 issued Mar. 21, 1967 discloses a two-circuit burglar alarm for vehicles, of which one is a setting circuit containing a master key switch for effectively arming the circuit by the owner of a vehicle when leaving the same, and an alarm circuit which is brought into operation upon any tampering with the vehicle; such alarm circuit operating for a time period independently of the setting circuit. An alarm system somewhat similar to Isaacs et al. and Birth is disclosed in U.S. Pat. No. 3,074,049, issued on Jan. 15, 1963 to F. G. Saliba and N. G. Satel of Lebannon. The present invention is directed to a relatively simple, inexpensive alarm device which obviates all of the disadvantages of prior systems and devices of this general nature which are all to a large extent complex and expensive with multiple circuitry and wiring, and with the alarm only operative if the main circuit is closed.

A primary object of my present invention is to provide a vehicle anti-theft device having the capacity to control one or more audible warning units with a minimum of electrical components.

Another important object of the invention is to provide an improved vehicle anti-theft device of the indicated nature which is additionally characterized by the inclusion of a time-delay component in an electrical circuit for effecting the mechanical opening of a relay contained in the circuit.

A still further object of my invention is to provide an improved vehicle anti-theft device of the aforementioned character which is fail-safe in that should the sensor wires be deliberately cut, the alarm would nevertheless operate in the same manner as in the case of opening the sensor switches.

Another object of my present invention is to provide an improved vehicle alarm device wherein the sensor wire of an electrical circuit functions as a safety fuse to reduce electrical hazard to a minimum.

Other objects of the invention, together with some of the advantageous features thereof, will appear from the following description of an embodiment thereof illustrated in the accompanying drawings evidencing the best mode of constructing the device and of the manner of using the same. It is to be understood that variations from such embodiment but within the concept are included in the appended claims.

Referring to the drawings.

In its preferred form and best mode of construction and manner of using the invention, my improved vehicle anti-theft warning device preferably comprises, in combination with a direct current source such as a battery as well as with a conventional horn installed on a motorcycle or other mobile unit, a casing sealed against ingress of water, moisture, dust and the like and relatively resistant to vibration, electrical components houses in said casing, a pair of electrical terminals on said casing to which said electrical components, said battery and said horn are detachably connected, together with a direct current electrical circuit containing said battery and said horn, a relay connected into said direct current circuit, a key-operated main switch controlling said circuit, and a rectifier connected to one contact of said relay controlling the sounding of said horn.

Figure 1:
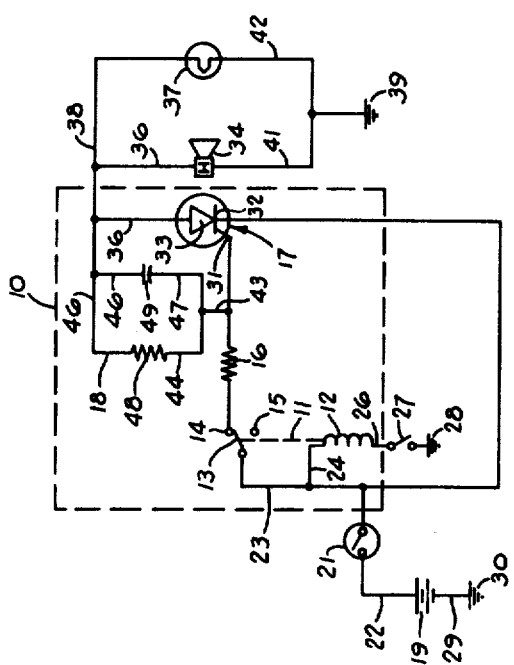
FIG. 1 is a schematic wiring diagram of a preferred embodiment of the invention.

As particularly illustrated in FIG. 1 of the annexed drawings, I provide a sealed casing which is shown in dotted lines and designated by the reference numeral 10 and which houses such principal components of my improved anti-theft warning device as a sensitive relay 11 provided with a spring-loaded armature 12 controlling the relay lever or arm 13 in respect to engaging either the relay contact 14 or the relay contact 15. Additional electrical components housed in moisture-proof and dust-proof casing 10 are a current limiting resistor 16, a semi conductor silicon gate-controlled rectifier, generally designated by the reference numeral 17, and a time-delay unit generally designated by the reference numeral 18. In accordance with the present invention, I provide a direct current circuit including a 6- or 12-volt battery 19 which may be the conventional storage battery installed and employed on a motorcycle, automobile or other mobile vehicle, as well as including a key-operated main switch 21 under the control of the owner or operator of any mobile unit upon which my improved device is installed. An insulated electrical conductor 22 connects the positive side of the battery 19 to one contact of main switch 21 and a lead 23 connects the other contact of the main switch to the relay 11. The armature 12 of relay 11 is connected into the direct current circuit by means of a lead 24 extending from the lead 23 to one end of armature coil 12 and an electrical conductor 26 connecting the other end of such armature 12 through a normally closed switch 27 to ground, as indicated at 28. To complete the circuit, the negative side of the battery 19 is connected by means of the conductor 29 to ground, as indicated at 30.

When the alarm circuit is energized by the closing of the main switch 21, a small current flows through the sensitive relay 11 to energize the armature coil 12 causing the relay arm 13 to be attracted to the coil and to engage lower relay contact 15 against the influence of a spring, not shown, connected to relay armature 12. This, of course, prevents any flow of current through current limiting resistor 16 to the rectifier 17. It is, of course, well known that the semiconductor silicon controlled rectifier 17 constitutes a one way switch allowing current to flow, when activated, through gate lead 31 to the cathode 32 thereof and from the cathode to the anode 33 but is unable to cut off the current flow even though the gate be deactivated, after once started to the horn 34 over electrical conductor 36 as well as through the flasher 37 over lead 38 and thence to ground, as indicated at 39, over lead 41 from the horn and lead 42 from the flasher to thus complete the circuit. Once the alarm is sounded, the only way to shut it off is by the use of the key to turn off main switch 21. The flasher 37 may or may not be used in the circuit, it being optional whether to let the horn to sound continuously or to make and break the circuit with a flasher so that the horn will sound intermittently. If desired, the headlights as well as the tail lights may be incorporated into the audio circuit with flasher so that the lights of the motorcycle may intermittently flash along with the sounding of the horn.

I also connect into the alarm circuit by means of leads 43, 44, 46 and 47, a resistor 48 and capacitor 49 to establish the time-delay circuit 18 in order to allow the relay armature time to open inasmuch as the mechanical motion is slower than the flow of current to the rectifier 17. It is to be understood that normally closed switch 27 is the alarm trip switch and being in an "on" position the current will flow through the relay circuit. If switch 27 is opened, even for a second, the relay 11 is de-energized allowing the lever or arm 13 to return under the action of a spring, not shown, to the upper contact 14 of relay 11 and permitting current to flow through the gate of the silicon controlled rectifier 17 turning it on as well as energizing the audio and visual devices. The switch 27 is preferably a mercury switch and it can be disposed in any one of several positions on the motorcycle or other mobile device on which the anti-theft device of the present invention is installed. When opened, by tilting of the motorcycle or lifting the mobile unit from its stand, the mercury in the switch will move to an opposite end of its cylinder to open the switch. Should an unauthorized person cut the wires of the relay circuit, the audio and visual devices will nevertheless operate and continue to operate since the relay arm 13 is caused to be moved to the upper contact 14 of the relay to effect activation of the rectifier 17 and its connected electrical components.

Figure 2:
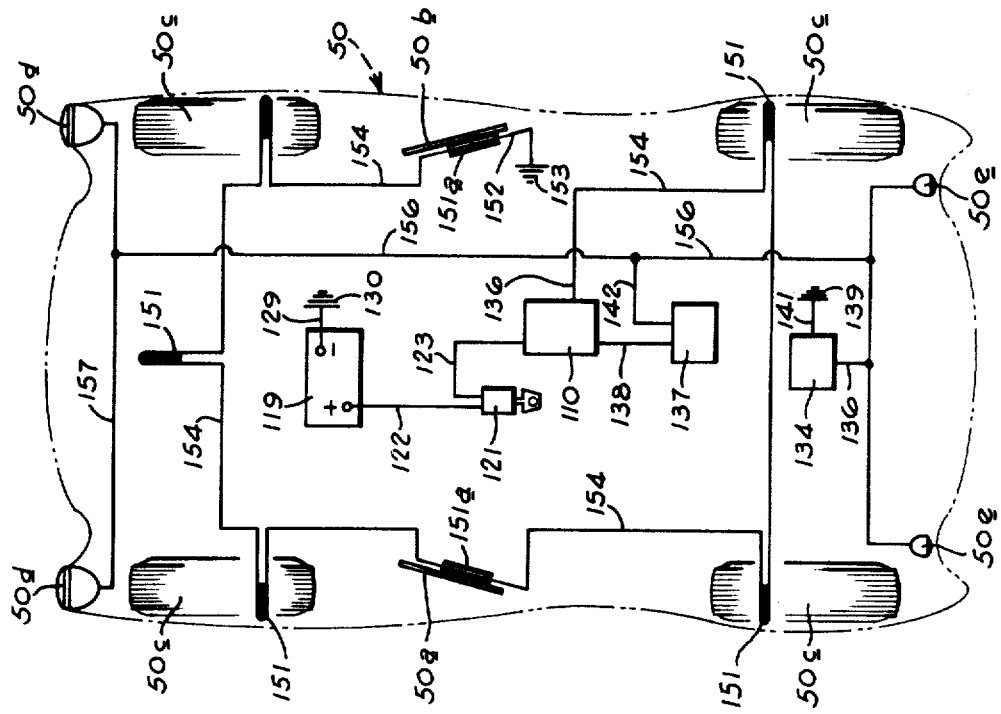
FIG. 2 is a schematic showing of one application of the invention as applied to automobiles.

In FIG. 2 of the annexed drawings, I have illustrated my electronic burglar alarm device, or anti-theft device as applied to an automobile, which is designated generally by the reference numeral 50 and which could be a stationary automobile parked in any garage or parking lot or trailer park or in one or more of many such automobiles in a used car lot or a dealer's repair car lot. As shown, I provide for such parked automobiles and trailers a somewhat more extensive electrical circuit which is basically similar to the circuit illustrated in FIG. 1 and which includes a sealed dust-proof and moisture-proof casing 110, aptly termed a command box, for housing the relay limiting resistor, silicon controlled rectifier and time-delay unit corresponding to the electrical components designated respectively by the reference numerals 11, 16, 17 and 18 in FIG. 1 of the drawings. In this parked automobile or trailer alarm or anti-theft device of my present invention there is included in the circuit the automobile or trailer battery 119 which is electrically connected to one contact of key-operated main switch 121 by means of electrical conductor 122 connected to the positive side of battery 119 with the other contact of main switch 121 connected by lead 123 to relay within the command box 110, thus supplying direct current to the relay and thence to ground through a normally closed switch, not shown in FIG. 2 but the same as the normally closed switch designated by numeral 27 in FIG. 1. This relay circuit is completed by connecting the negative side of battery 119 by means of electrical conductor 129 to ground, as indicated at 130.

In accordance with the present invention, as exemplified in an anti-theft device for parked vehicles and trailers in parking lots, camps and trailer parks or the like, the electrical circuit of the device is extended so that should any unauthorized person tamper with the car or trailer, such as by raising the hood thereof, or by attempting to or slipping a tool through or past the molding between the door frame and the car windows, indicated at 50a and 50b in FIG. 2 of the annexed drawings, in order to enter the driver's compartment, or by some means start the motor and move the automotive vehicle to move the wheels 50c, the horn 134 will sound; the flasher 137 will operate and the head lights 50d as well as the tail lights 50e will be illuminated and intermittently flash on and off. These results are accomplished with my improved vehicle anti-theft device by connecting into the circuit, in series, a plurality of mercury switches 151 which are secured in normally closed positions by means of suitable adhesive tape, glue or like means to the underside of the hood of the car as well as the head lights 50d and tail lights 50e within the housings thereof. The mercury switches at the wheels 50c are fastened to the wheel rims by means of clips or by magnetized strips, both not shown, between the rims of the wheels and a stationary part of the frame of the car. Additionally, flexible strips 151a are connected into the extended circuit; such strips consisting of an outer insulated covering housing electrical leads together with electrical contacts at opposite ends thereof and being glued or otherwise fastened in operative positions on the inside of the left and right windows 50a and 50b, respectively of the vehicle.

Tilting or raising of the car or trailer hood will cause the mercury switches to tilt with the mercury in the tubes breaking away from the electrical contacts and opening the circuit in which all of the mercury switches 151 are connected, which circuit includes the electrical conductor 154 leading from the rectifier within command box 110. As shown, the conductor 154 is connected first to the rear wheels 50c and thence to the strip 151a on the left window 50a from which the lead 154 is extended to the switch attached to the left front wheel 50c, i.e. the rim thereof, and thence to the switch 151 secured to the underside of the hood of the car, thence to the rim of the right front wheel 50c from which the lead 154 extends to the strip conductor 151a secured to the right window 50b of the vehicle, and thence to the conductor 132 and to ground, as indicated at 153 which is a stationary part of the chassis, all as depicted schematically in FIG. 2 of the drawings.

It is clear that distortion of the molding between the windows 50a and 50b and the door frames, such as by insertin or attempting to insert a tool therebetween or past the same will similarly open the electrical circuit, as will also occur upon the rolling of the wheels 50c resulting, as above stated, the sounding of the horn and operation of the flasher and the intermittent flashing of the headlights and tail lights. I also provide an electrical conductor 156 in the circuit leading from the flasher 137 which, of course, is the circuit containing the rectifier, to a conductor 157 at the front of the car and connected to the head lights 50d, as well as leading from the flasher 137 to a rear electrical conductor 158 which, in turn is electrically connected to the tail lights 50e of the car or trailer, thus causing these lights as well as the head lights to flash on and off upon the breaking of the circuit containing the relay and establishing the alarm circuit containing the semiconductor, or silicon controlled rectifier, designated by the reference numeral 17 in FIG. 1 and contained in the command box 110 shown in FIG. 2. It is to be understood that additional mercury switches 151 or strip conductors can be connected in series as component parts of the alarm circuit and mounted at strategic parts or points of the parked automobile or trailer.

The appended claims are intended to cover the embodiments illustrated as well as modifications thereof within the scope of the claimed invention.

I claim:

1. A vehicle anti-theft device; said vehicle having a body on which at least one of the devices may be removably mounted; said device comprising, in combination, a source of direct current, means for establishing a direct current relay circuit containing said source; said means comprising a key-operated switch, a relay electrically connected to said switch and consisting of a first relay contact, a second relay contact, an armature, and a spring-loaded arm for making engagement with said first relay contact and said second relay contact, and a normally closed switch in series with said armature and said source to effect direct current flow from said source of direct current through said key-operated switch and said relay and said second relay contact upon the energization of said armature, and an alarm circuit comprising said direct current source; said alarm circuit being established upon the opening of said direct current circuit to cause de-energization of said armature and movement of said spring-loaded arm into engagement with said first relay contact and comprising a gate-controlled semiconductor rectifier consisting of a gate and a cathode and an anode, an electrical conductor connecting said first relay contact to said gate and said cathode of said rectifier, an audio alarm unit, and an electrical conductor connecting said anode of said rectifier to said audio alarm unit which is electrically connected to said source.

2. A vehicle anti-theft device as set forth in claim 1, and a current limiting resistor connected into said alarm circuit between said first relay contact and said gate of said rectifier.

3. A vehicle anti-theft device as set forth in claim 2, and a time-delay unit connected into said alarm circuit between said first relay contact and the output of said rectifier to compensate for the slow mechanical movement of said spring-loaded relay arm between said second relay contact and said first relay contact.

4. A vehicle anti-theft device as set forth in claim 1 wherein said normally closed switch is a mercury switch.

5. A vehicle anti-theft device as set forth in claim 1, and a flasher element connected into said alarm circuit for intermittently opening and closing said alarm circuit and thereby effect the intermittent sounding of said audio unit.

6. A vehicle anti-theft device as set forth in claim 1, and a plurality of visual elements connected into said alarm circuit.

7. A vehicle anti-theft device as set forth in claim 4, and a plurality of said mercury switches connected into said direct current relay circuit and mounted in a plurality of places on said body of the vehicle for establishing said alarm circuit when at least one of said plurality of mercury switches is opened.

* * * * *